United States Patent [19]

North

[11] 3,940,399

[45] Feb. 24, 1976

[54] PROCESS FOR THE PRODUCTION OF GAMMA QUINACRIDONE

[75] Inventor: Robert Jarl North, Clifton, N.J.

[73] Assignee: Allied Chemical Corporation, New York, N.Y.

[22] Filed: Oct. 29, 1974

[21] Appl. No.: 518,662

[52] U.S. Cl. .................................. 260/279 QA
[51] Int. Cl.$^2$ .................................. C09B 48/00
[58] Field of Search ............ 260/279 R, 79, 279 QA

[56] References Cited
UNITED STATES PATENTS 3,257,405   6/1966   Gerson et al. .................... 260/279 R
3,342,823   9/1967   Dien .............................. 260/279 R

*Primary Examiner*—R. Gallagher
*Assistant Examiner*—Diana G. Rivers
*Attorney, Agent, or Firm*—Anthony J. Stewart; Jay P. Friedenson

[57] ABSTRACT

A method is provided for the direct production of the gamma crystalline phase of quinacridone. The method comprises ring closing a mixture of dianilinoterephthalic acid and 10 – 20 weight percent of di-(ortho substituted) anilinoterephthalic acid in polyphosphoric acid and thereafter diluting the product with water.

3 Claims, No Drawings

PROCESS FOR THE PRODUCTION OF GAMMA QUINACRIDONE

BACKGROUND OF THE INVENTION

This invention relates to quinacridone pigments. More particularly this invention relates to a process for producing the gamma crystalline phase of quinacridone pigment (hereinafter termed gamma quinacridone).

Linear quinacridone is represented by the structure

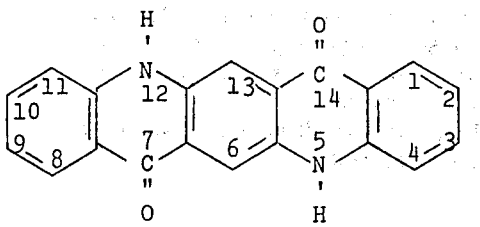

and, as is disclosed in U.S. Pat. No. 2,844,581, exists in a number of crystalline phases, including the alpha phase, the beta phase and the gamma phase.

Recently, gamma quinacridone pigment has found a ready market in the automotive and architectural industries in view of the fact that this pigment produces a deep red metallic finish in the quinacridone color region. Heretofore, pigment size gamma quinacridone has been commercially produced by milling quinacridone after it is produced by oxidation of dihydroquinacridone. Note U.S. Pat. No. 2,844,581. Other patents in this same general area are U.S. Pat. Nos. 3,160,510; 3,257,405 and 3,342,823. The milling of quinacridone to produce the gamma quinacridone pigment is, of course, an additional step in the production of the pigment and requires additional energy input, time, equipment, etc.

It is an object of this invention to produce gamma quinacridone. It is a further object of this invention to produce gamma quinacridone directly from the ring closure of dianilinoterephthalic acid. These and other objects will become apparent from the description which follows.

SUMMARY OF THE INVENTION

In accordance with this invention there is provided a process for producing gamma quinacridone pigment which comprises heating, at above about 70°C., a mixture of dianilinoterephthalic acid containing about 10 – 20 weight percent of di-(ortho substituted) anilinoterephthalic acid in the presence of polyphosphoric acid and thereafter recovering the gamma quinacridone by the addition to the mixture of water.

When operating in accordance with the present invention, i.e., the ring closure of dianilinoterephthalic acid in the presence of the ortho substituted dianilinoterephthalic acid, it has been found that the pigmentary product produced by the drowning, i.e., diluting, in the water miscible organic liquid is the gamma quinacridone, i.e., exhibits an X-ray diffraction pattern consistent with that generally recognized as identifying the gamma crystalline form of quinacridone. Thus, the process of the present invention provides a process for the direct production of gamma quinacridone and eliminates the need for the extra milling step which is heretofore been necessary for the production of this crystalline phase of the quinacridone pigment.

DETAILED DESCRIPTION OF THE INVENTION

The gamma quinacridone pigment produced by the process of the present invention have excellent outdoor durability and are useful in coloring automotive finishes, inks and house paints. They are particularly valuable in preparing red architectural finishes and transparent automotive metallic finishes.

The process of the present invention provides a simple economic route to gamma quinacridone which eliminates the need for certain operations heretofore thought necessary for the production of this crystalline phase of quinacridone. Furthermore, it is quite unexpected that the process of the present invention would produce gamma quinacridone inasmuch as present quinacridone technology would ordinarily predict that drowning a polyphosphoric acid solution of unsubstituted quinacridone containing 10 – 20 parts by weight of the di-ortho substituted quinacridone with water would produce the violet, beta phase type of quinacridone. It has been found, however, that this is not the case and that by operating within the confines of the present invention the quinacridone produced exhibits a gamma type of X-ray pattern.

In carrying out the process for the present invention, the dianilinoterephthalic acid is mixed with 10 – 20 percent of di-(ortho substituted) anilinoterephthalic acid and dissolved in polyphosphoric acid. The use of polyphosphoric acid as a ring closing agent is well known in the quinacridone art as exemplified by U.S. Pat. Nos. 3,257,405 and 3,342,823. As indicated in that prior art, the polyphosphoric acid should have an acid content ($H_3PO_4$) of at least 100 percent. Preferably, the polyphosphoric acid strength is between 114 – 120 percent. The mixture is heated while being stirred at a temperature of above 70°C., preferably between 80°– 120°C. After the ring closure has been accomplished, which usually takes from 4 – 16 hours, the mixture is diluted, after being cooled to below 100 C., with water. The addition of the water results in a slurry which is then stirred, heated to boiling and thereafter filtered, washed acid free, boiled with caustic soda to remove traces of acid, filtered, washed alkali free and dried to yield the red solid gamma phase quinacridone pigment.

As has been indicated above, the amount of di-(ortho substituted) anilinoterephthalic acid is between 10 – 20 weight percent of the dianilinoterephthalic acid starting material. Amounts higher than 20 percent or lower than 10 percent result in a product which has a significant change in its X-ray diffraction pattern indicating that the gamma quinacridone is not being produced as desired. By "ortho substituted" dianilinoterephthalic acid is meant substitution at the 4,11-positions of dianilinoterephthalic acid. Halogen substituents, i.e. chlorine, fluorine, bromine and iodine, especially chlorine, are the preferred substituents in accordance with the present invention. Other exemplary substituents which may be mentioned are alkyl, i.e. methyl, ethyl, propyl and butyl; alkoxy, i.e. methoxy, ethoxy, propoxy, butoxy; halogenated alkyls, that is, mono, di- and tri-halogenated alkyl containing 1 – 4 carbon atoms, and carboalkoxy containing 1 – 4 carbon atoms, such as carbomethoxy and carboethoxy.

DESCRIPTION OF PREFERRED EMBODIMENTS

The following example is given by way of illustration only.

25.1 parts of dianilinoterephthalic acid and 2.74 parts of di-(o-chloroanilino) terephthalic acid are added to 195 parts of polyphosphoric acid having an acid strength of 116.6%. The mixture is heated at 102°–106°C. for 16 hours and thereafter cooled to 90°C. The cooled mixture is poured into 100 parts of water at 20°C. The resulting slurry is stirred for 15 minutes, boiled for 1 hour and thereafter filtered, washed acid free and reslurried with 75 parts of 50% sodium hydroxide and 1500 parts of water and boiled for 1 hour. Filtration, washing alkali free and drying at 180°F. overnight yields 23 – 25 grams of a red solid with an X-ray pattern essentially of gamma quinacridone. (All parts are indicated by weight unless otherwise designated.)

I claim:

1. A process for producing gamma quinacridone which comprises heating, between 80° and 120°C, a mixture of dianilinoterephthalic acid containing 10–20 weight percent of di-(ortho substituted) anilinoterephthalic acid in the presence of polyphosphoric acid and thereafter diluting the reaction mixture with water and recovering the precipitated gamma quinacridone, wherein the substituents on the di-(ortho substituted) anilinoterephthalic acid are halogens, alkyl containing 1 – 4 carbon atoms, alkoxy containing 1 – 4 carbon atoms, halogenated alkyl containing 1 – 4 carbon atoms or carboalkoxy containing 1 – 4 carbon atoms.

2. The process as defined in claim 1 wherein the substituent is chlorine.

3. The process as defined in claim 1 wherein the substituents are methyl.

* * * * *